United States Patent [19]
Sisk et al.

[11] 3,794,169
[45] Feb. 26, 1974

[54] APPARATUS FOR DISSOCIATING COLLECTED SOLIDS FROM A FILTRATION MEMBRANE

[75] Inventors: Francis J. Sisk; Robert F. Watson, Jr., both of Pittsburgh, Pa.

[73] Assignee: Westinghouse Electric Corporation, Pittsburgh, Pa.

[22] Filed: May 15, 1972

[21] Appl. No.: 253,489

[52] U.S. Cl................. 210/140, 210/321, 210/410, 210/411
[51] Int. Cl............................................. B01d 31/00
[58] Field of Search ... 210/140, 321, 409, 410, 411, 210/412

[56] References Cited
UNITED STATES PATENTS
3,498,910   3/1970   Mendelson............................ 210/23
3,389,797   6/1968   Giardini........................... 210/408 X
3,533,507   10/1970  Aitken............................ 210/412 X Primary Examiner—Frank A. Spear, Jr.
Attorney, Agent, or Firm—F. J. Baehr, Jr.

[57] ABSTRACT

Apparatus for producing a rapid reduction in the pressure followed by a high velocity slug of liquid to dissociate collected solids from a filtration membrane surface utilizing an air accumulator, check valve and a timed rapid pressure blowdown to dislodge the collected solids and flush them from the membrane; or utilizing a high volume recirculating pump for recirculating liquid suffused with air and periodically stopping the pump for a predetermined time interval and draining liquid from adjacent the membrane, resulting in a reduction of the pressure, and then starting the recirculating pump to provide a high velocity flow of liquid to flush collected solids from the membrane.

11 Claims, 2 Drawing Figures

PATENTED FEB 26 1974 3,794,169

APPARATUS FOR DISSOCIATING COLLECTED SOLIDS FROM A FILTRATION MEMBRANE

BACKGROUND OF THE INVENTION

This invention relates to ultra-filtration and more particularly to apparatus for flushing away solids which tend to collect adjacent a filtration membrane.

Successful application of ultra-filtration membranes to various sewage treatment depends on preventing fouling or blockage of the filtration membrane's pores by undissolved solid cakes and high molecular weight organic solutions or gels, which tend to collect adjacent to the membrane. To effectively remove the cakes or gels requires fracturing them and then washing them away with high velocity turbulent flows.

The formation of such cakes and gels could be retarded by producing very high velocity, steady, turbulent flows adjacent the membrane, however, the pumping cost makes such a solution uneconomical; therefore, periodic high energy flushing removal of the cakes and gels provides an economical compromise.

SUMMARY OF THE INVENTION

In general, apparatus for dissociating solids and gels which tend to collect adjacent one surface of a filtration membrane, when made in accordance with this invention, comprises a housing for the membrane, the housing comprises an inlet port for influent fluid having undissolved solids disposed therein, an outlet port for effluent fluid having undissolved solids disposed therein, the inlet and outlet ports being in fluid communication with each other and with one side of the membrane, and a filtrate port disposed to remove filtrate from the housing. The apparatus also comprises a vessel in fluid communication with the inlet and outlet ports, the vessel being adapted to have a liquid level disposed therein, means for blowing down the vessel to remove concentrated solids, means for supplying pressurized influent liquid having undissolved solids and a gas suffused therein to the inlet port and means for providing a periodic decrease in pressure in the housing for a predetermined time interval followed by a slug of high velocity liquid, which excites the boundary layer of liquid adjacent the one surface of the membrane to produce transient shear forces between the liquid and the one side of the membrane to dissociate the solids and gels, which tend to collect adjacent the one surface of the membrane, and flush them from the housing, thereby improving the rate at which filtrate flows through the membrane.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
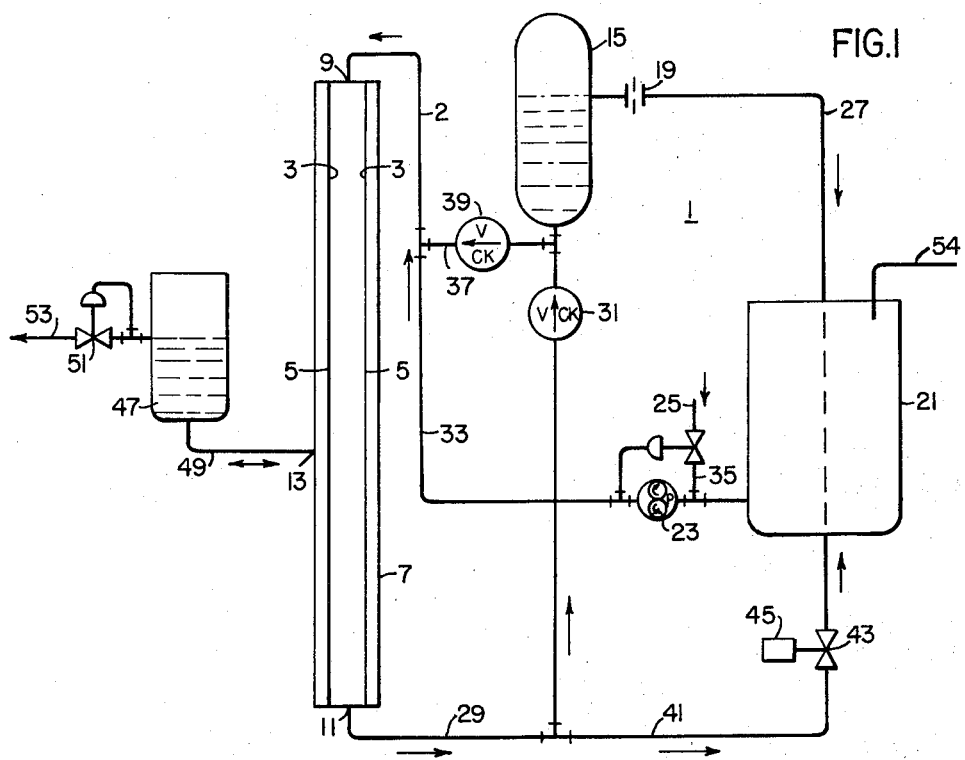
FIG. 1 is a schematic diagram showing one embodiment of apparatus for dissociating collected solids and gels from the surface of a filtration membrane.

Referring now to the drawings in detail, there is shown apparatus 1 for dissociating solids and gels which tend to collect adjacent one surface 3 of a filtration membrane 5. The apparatus 1 comprises a housing 7 having means therein for supporting the membrane 5. The housing comprises an inlet port 9 disposed in the upper portion of the housing 7 for receiving influent fluid, such as water, having undissolved solids and a gas, such as air, suffused therein, an outlet port 11 disposed in the lower portion of the housing 7 for discharging effluent fluid having undissolved solids and gases suffused therein from the housing 7, and a filtrate port 13 disposed to remove filtrate from the housing 7. The membrane 5 is so disposed in the housing 7 to provide a barrier through which the filtrate must pass in flowing from the inlet port 9 to the filtrate port 13.

A vessel 15 is disposed to be in fluid communication with the inlet and outlet ports 9 and 11, respectively, and is adapted to have a liquid level maintained therein. The vessel 15 also has means for blowing concentrated solids from the vessel. The blowdown may be a valve 17, which maintains a constant pressure in the vessel, or orifice 19, which blows down the concentrated solids at a fixed or constant rate, or other means for removing concentrated solids from the vessel.

A reservoir 21 is provided to retain fluid having undissolved solids suffused therein and the blowdown from the vessel 15 normally discharges therein. Feed containing solids enters reservoir 21 via feed line 54 and means are normally provided (not shown) for separation and removal of solids from reservoir 21.

A high head pump 23 obtains its suction from the reservoir 21 and provides means for supplying pressurized fluid having undissolved solids disposed therein to the apparatus and an air or gas supply 25 is disposed adjacent the suction of the pump 23 to introduce air into the liquid so that the pump admixes the air, suffusing it throughout the liquid. The quantity of air supplied is in excess of the quantity required to saturate the liquid with air.

The apparatus also comprises means for periodically decreasing the pressure in the housing for a predetermined time interval followed by a slug of high velocity liquid, which excites the boundary layer of liquid adjacent one side of the membrane to produce transient shear forces between the liquid and the one side of the membrane, to dissociate the solids and gels, which tend to collect adjacent the one surface of the membrane, and flush them from the housing, thereby improving the flux on the rate at which filtrate flows through the membrane. The means for periodically decreasing the pressure followed by a slug of high velocity liquid will be discussed hereinafter in detail along with the description of the specific embodiments.

In the embodiment as shown in FIG. 1, the apparatus 1 comprises the vertically elongated housing 7 with the inlet and outlet ports 9 and 11 disposed respectively in the upper and lower portions of the housing 7. The filtrate port 13 is disposed about midway along one side of the housing 7 and is adapted to drain filtrate from the housing. The membrane 5 is so disposed within the housing to provide a barrier through which the filtrate must pass in flowing from the inlet to the filtrate port.

The vessel 15 is disposed adjacent the upper end of the housing 7 and is adapted to have a liquid level maintained about its mid-section, and a blowdown orifice is disposed adjacent the liquid level and continuously drains concentrated solids and gels, which float to the surface due to the surplus air suffused through the liquid, via a conduit 27, which discharges into the reservoir 21.

The vessel 15 is connected to the outlet port via a conduit 29, which contains a check valve 31. The check valve 31 provides means for preventing the back flow of liquid from the vessel 15 to the outer port 11.

The high head pump 23 is disposed in a conduit 33 connecting the reservoir 21 to the inlet port 9 and air is supplied to the suction of the pump 23 via a conduit 35, which has disposed therein the constant pressure valve 25.

A conduit 37, having a check valve 39 disposed therein, is disposed to be in fluid communication with the vessel 15 and the conduit 33 placing the vessel in fluid communication with the inlet port 9. The check valve 39 is adapted to provide means for preventing back flow of fluid from the inlet port 9 to the vessel 15.

A conduit 41 is disposed between the conduit 29 and the reservoir 21 placing the outlet port in fluid communication with the reservoir 21. A fast operating valve 43 is disposed in the conduit 41 and has an operator or solenoid 45, which is rapidly operable to open the valve periodically for a predetermined timed interval.

A tank 47 is disposed adjacent the midsection of the housing 7 and is placed in fluid communication with the filtrate port 13 via conduit 49. A filtrate blowdown valve 51 is disposed in a conduit 53 in fluid communication with the midsection of the tank 47 and a liquid level is maintained at this elevation in the tank. The filtrate blowdown valve 51 is adapted to maintain a constant pressure, substantially lower than the pressure within the membrane 5 but higher than ambient pressure, within the tank 47 by only opening when the pressure exceeds a predetermined value.

The operation of the embodiment shown in FIG. 1 is as follows:

Influent fluid, comprising a liquid with undissolved solids along with air, is fed to the suction of the pump 23. The air is mixed with the liquid and is fed to the inlet port under pressure via conduit 33. As the influent liquid flows downwardly through the housing some of the liquid and air passes through the membrane and out the filtrate port 13. Some undissolved solids and high molecular weight organic solutions remain on the one side 3 of the membrane 5 and tend to collect thereon forming a cake or gel, which tends to block the flow of liquid through the pores of the membrane 5 and reduce the flux or flow rate therethrough. Effluent fluid, comprising liquid, undissolved solids and air, flows through the outlet port 11 and conduit 29 to the vessel 15, wherein the air separates from the liquid and buoys some of the undissolved solids to the top of the liquid, where they form a head of concentrated undissolved solids, which are blown down via conduit 27. The orifice 19 disposed in conduit 27 controls the rate and pressure at which they are blown down.

Periodically to dissociate the cake or gel from the one side of the membrane 5, the operator 45 rapidly opens the valve 43 for a predetermined time interval, which rapidly reduces the pressure in the housing producing a shock wave, which traverses the housing producing a low pressure area followed by a slug of high velocity liquid, which excites the boundary layer of liquid adjacent the one side of the membrane 5 to produce transient shear forces between the liquid and the one side of the membrane to dissociate the solids and gels, which tend to collect adjacent the surface of the membrane, and flush them from the housing as the slug of liquid traverses the membrane 5. The air space in the vessel 15 cooperates with the check valves 31 and 39 to store the necessary energy to provide the high velocity wave front, which dissociates the cake or gel from the membrane and flushes it from the housing. Thus, when the pressure is released by rapidly opening the valve 43, the expanding air creates the shock wave, which shears and dislodges the cake. The air suffused filtrate is also pressurized providing back flow through the membrane, which cooperates with the shearing and dislodging caused by the shock wave and the turbulence resulting from the high velocity slug to dissociate the cake or gel from the one surface of the membrane and flush it out of the housing through the conduit 41. After a predetermined time interval the valve 43 closes and the apparatus again begins to produce filtrate at a desirable rate.

Figure 2:
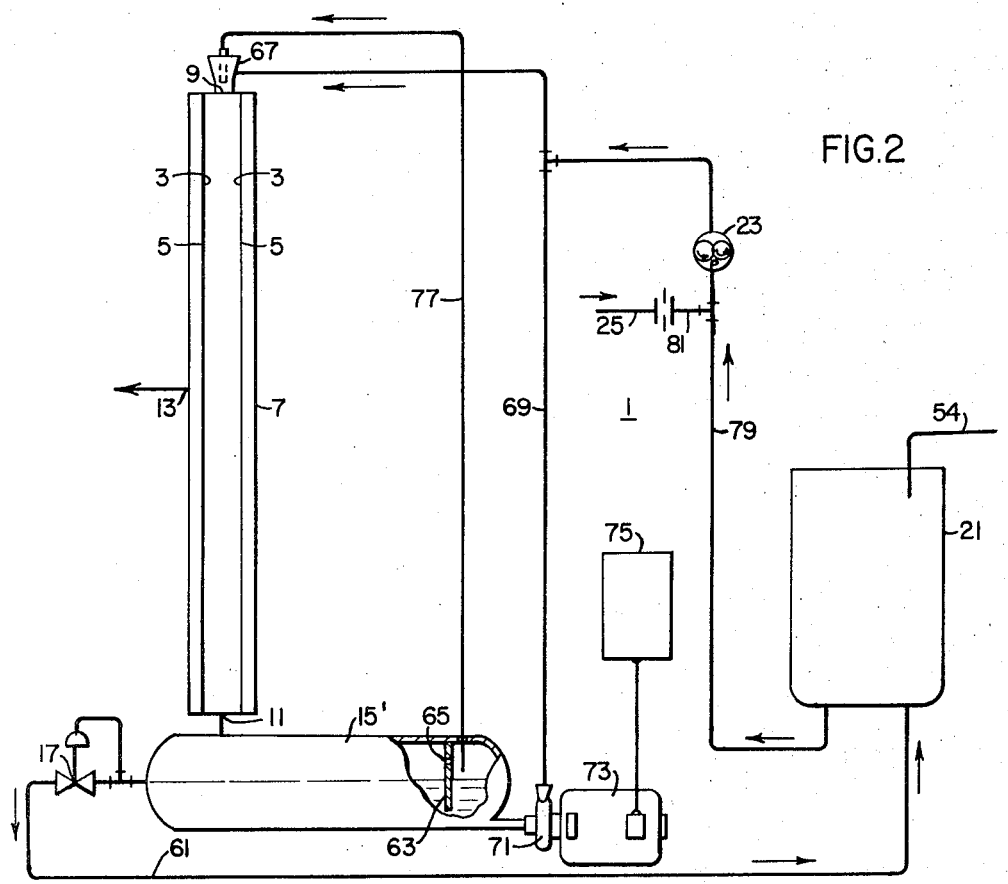
FIG. 2 is a schematic diagram showing another embodiment of apparatus for dissociating collected solids and gels from the surface of a filtration membrane.

In the embodiment shown in FIG. 2, the apparatus comprises the vertically elongated housing 7 with the inlet and outlet ports 9 and 11 disposed respectively in the upper and lower portions thereof. The filtrate port 13 is disposed in the mid-section in one side of the housing and is adapted to drain filtrate from the housing. The membrane 5 is so disposed within the housing to provide a barrier through which the filtrate must pass in flowing from the inlet port 9 to the filtrate port 13.

The vessel 15' is disposed adjacent the lower end of the housing 7 and is in fluid communication with the outlet port 11. A liquid level is maintained in the vessel 15' and a blowdown valve 17 is disposed in a conduit 61 connecting the vessel 15' to the reservoir 21. The blowdown valve 17 only opens, when the pressure in the vessel 15' exceeds a predetermined value, and the conduit 61 is connected to the vessel 15' at an elevation where the liquid level is maintained, so that undissolved solids buoyed to the top of the liquid by the air are concentrated and may be blown down.

A baffle 63 is disposed adjacent one end of the vessel 15' and extends downwardly from the top of the vessel to below the liquid level and has an opening 65 disposed therein for allowing air to pass from one side of the baffle 63 to the other, while preventing the buoyed undissolved solids from flowing to the one end of the vessel 15'.

The inlet port 9 has associated therewith an ejector 67 to which high velocity liquid is supplied via conduit 69. A circulating or high volume pump 71 is disposed in conduit 69 and takes its suction from the vessel 15'. The pump 71 is operated by a motor 73, which is controlled by a controller and timing device 75, which is operable to periodically shut off the motor 73 to stop the pumps 71 for a predetermined time interval.

A conduit 77 is so disposed to be in communication with the ejector 67 and with the upper portion of the vessel 15', whereby air from the vessel flows to the ejector 67 and admixes with the liquid introduced by the conduit 69. The lower end of the conduit 77 is disposed right above the normal liquid level in the vessel 15'.

A conduit 79 is disposed to be in fluid communication with the reservoir 21 and the conduit 69 and has the high pressure pump 23 disposed therein. An air supply conduit 81 is disposed to connect to the conduit 79 adjacent the suction of the pump 23 and has an orifice 25 disposed therein to regulate the quantity of air flowing into the conduit 79 so that there is a sufficient quantity of air added to the influent liquid to saturate the liquid and allow some air to leak through the membrane and to replenish the supply of air in the vessel 15'.

The operation of the embodiment shown in FIG. 2 is as follows:

Liquid having undissolved solids disposed therein is supplied from the reservoir 21 via conduit 79 to the suction of the pump 23, where it is admixed with air and pressurized producing an influent liquid for the system. The influent liquid enters conduit 69, wherein it mixes the liquid with undissolved solids disposed therein. The combined flow of fluid enters the ejector 67, wherein it mixes with air supplied through the conduit 77 and flows downwardly through the housing 7. A portion of the liquid and air passes through the membrane 5 and out the filtrate port 13; some of the undissolved solids and high molecular weight organic solutions tend to collect adjacent one side 3 of the membrane 5 forming a cake or gel and the remaining liquid and undissolved solids and air flow downwardly forming the effluent fluid, which flows out the outlet port 11. The outlet port 11 is adapted to restrict the flow, so that the housing 7 is flooded with liquid and pressurized to a predetermined value. The effluent fluid splashes as it flows into the vessel 15' and some of the suffused air separates from the liquid buoying the solids to the top forming a concentrated head of solids above the liquid level. Blowdown is taken from the vessel 15 at a location, where the solids are concentrated. The blowdown flows via conduit 61 to the reservoir 21. The liquid flows under the baffle 63 to the suction of the pump 71, while air flows through the opening 65 to the conduit 77. Periodically the timing controller 75 cuts off the power to the motor 73 shutting off the pump 71, which stops the circulation of liquid, allowing the housing to drain to a level, wherein the end of the conduit 77 is submerged, which shuts off the air to the conduit 77 causing air to bubble up through the housing, stimulating the cake or gel as the housing fills with air. As the housing 7 is filled with air the air escapes through the membrane and the pressure drops rapidly. After a predetermined time interval the circulating pump is started producing a surge or slug of high velocity liquid which excites the boundary layer of the liquid adjacent the one side of the membrane to produce a transient shear force between the liquid and the one side of the membrane, which cooperates with the weight of the cake to dissociate it from the surface of the membrane and flush it into the vessel. As the level in the vessel drops to its normal operating level, the end of the conduit 77 emerges from the water and air begins to circulate with the water, and as the membrane becomes wetted, the air leakage therethrough is reduced slowly building up the pressure within the housing 7 to a predetermined level and the blowdown of concentrated solid via conduit 61 begins as the pressure exceeds a predetermined value. Thus, the system again begins to produce filtrate at a desirable rate.

The apparatus, hereinbefore described, advantageously removes fouling from one side of the membrane by periodically interrupting the steady state flow and introduces periodic high velocity flow, which produce transient shear forces between the liquid and the membrane to fracture the cake or gel and wash it away with a minimum amount of power comsumption.

What is claimed is:

1. Apparatus for dissociating solids, which tend to collect adjacent one surface of a filtration membrane from said one surface, said apparatus comprising means for supporting said membrane, a housing for containing said membrane and said supporting means, said housing comprising an inlet port for influent fluid having undissolved solids disposed therein, an outlet port for effluent fluid having undissolved solids disposed therein, the inlet and outlet ports being in fluid communication with each other and with said one surface of said membrane, and a filtrate port disposed to remove filtrate from said housing, a vessel in fluid communication with said inlet and outlet ports, said vessel being adapted to have a liquid level disposed therein, means for blowing down said vessel to remove concentrated solids, means for supplying pressurized influent liquid having undissolved solids suffused therein to the inlet port, means for admixing a gas with said influent liquid and means for providing a periodic decrease in pressure in the housing for a predetermined time interval followed by a slug of high velocity liquid adjacent said one surface to excite the boundary layer of liquid adjacent said one surface of the membrane to produce transient shear forces between the slug of liquid and said one surface of the membrane to dissociate the solids, which tend to collect adjacent said one surface of the membrane and flush them from the housing, thereby improving the rate at which filtrate flows through the membrane.

2. Apparatus as set forth in claim 1 and further comprising a tank disposed in fluid communication with the filtrate port, said tank being adapted to separate the filtrate from the gas and means for maintaining a predetermined pressure in said tank, thus providing an energy source to produce a back flow through the membrane during the time interval when the pressure in the modules is decreased to assist in the dissociating collecting solids from the one surface of the membrane.

3. Apparatus as set forth in claim 2 and further comprising a first conduit connecting the vessel and the outlet port, a second conduit in fluid communication with the inlet port and adapted to supply the influent liquid thereto, a third conduit in fluid communication with the second conduit and the vessel, means for preventing back flow of liquid from the vessel to the outlet port disposed in the first conduit and means for preventing the back flow of liquid from the second conduit to the vessel.

4. Apparatus as set forth in claim 1 and further comprising means for pressurizing the influent fluid and means for suffusing a gas in said pressurized fluid.

5. Apparatus as set forth in claim 4 and further comprising means for rapidly discharging effluent fluid from said outlet port.

6. Apparatus as set forth in claim 5 and further comprising a reservoir from which the means for pressurizing the fluid obtains its suction and into which the discharging means discharges.

7. Apparatus as set forth in claim 1, wherein the filtrate discharges to atmosphere.

8. Apparatus as set forth in claim 1 and further comprising means for circulating the liquid from the inlet to the outlet port at a high rate, means for inducing a pressurized stream of liquid having dissolved solids and suffused gas disposed therein in the influent liquid flowing to the inlet port.

9. Apparatus as set forth in claim 8 and further comprising ejecting means for mixing gas from above the liquid level in the vessel with influent liquid to produce a gas suffused liquid which flows from the inlet to the outlet port of the housing.

10. Apparatus as set forth in claim 9 and further comprising timing means which shuts off the circulating means for a predetermined time interval to drain liquid from the housing and allow the gas to fill the housing and diffuse through the membrane reducing the pressure in the housing.

11. Apparatus as set forth in claim 10 and further comprising a reservoir from which the pressurizing means obtains its supply of liquid and into which the blowdown means discharges.

* * * * *